March 10, 1970 H. G. FEISSEL 3,500,356

FERROMAGNETIC-FILM MEMORY ELEMENTS WITH TWO FLUX CLOSURE ELEMENTS

Filed Dec. 15, 1967 3 Sheets-Sheet 1

Inventor:
Henri Gerard Feissel

BY Baldwin Wight Diller & Brown
Attorneys

Inventor:
Henri Gerard Feissel
BY Baldwin Wight Diller & Brown
Attorneys

Inventor:
Henri Gerard Feissel
BY Baldwin Wight Diller & Brown
Attorneys 3,500,356

FERROMAGNETIC-FILM MEMORY ELEMENTS WITH TWO FLUX CLOSURE ELEMENTS

Henri Gérard Feissel, Paris, France, assignor to Societe Industrielle Bull-General Electric (Societe Anonyme), Paris, France Filed Dec. 15, 1967, Ser. No. 690,853
Int. Cl. G11c *11/14, 7/02;* H01f *41/14*
U.S. Cl. 340—174 7 Claims

ABSTRACT OF THE DISCLOSURE

As component of a rapid matrix memory, a data storage element comprises an anisotropic magnetic film disposed at the crossing point of a first and a second conductor, two closing bridges of isotropic magnetic material applied to the same face of the said film so as each to close respectively a magnetic circuit around one of the said conductors, the second closing bridge having the form of a C disposed flat, composed of two legs and of a connecting member, permitting the use of relatively simplified deposition methods.

Figure 4:
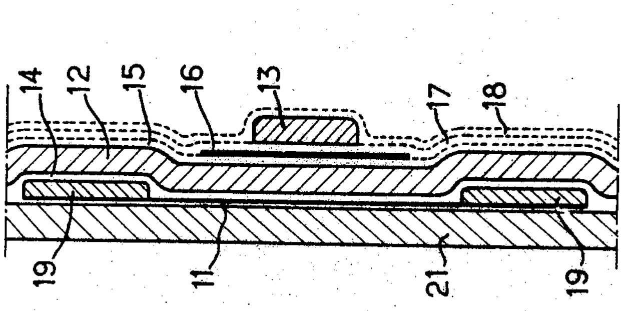

This invention relates to matrix memories and concerns more particularly improvements in ferromagnetic-film storage elements employed to form a rapid memory of high capacity and small overall dimensions.

This type of memory is now well known and it will be recalled that in general a memory plane is formed by the association of two orthogonal sets of excitation conductors and of a number of flat magnetic-film elements disposed at the crossing points of these conductors on an appropriate support. It is also known that it is conventional to call the conductors of one set the "word" conductors, and the conductors of the other set the "digit" conductors.

Generally, each memory element is formed of an anisotropic magnetic film having two stable states of magnetisation and constituting an "open" magnetic circuit, i.e. a part of its flux path extends through the air. The fact that the magnetic circuit is open involves a number of disadvantages. The memory element is very sensitive to disturbing fields and this effect imposes severe limitations in the choice of the dimensions. These limitations preclude the provision of a large number of these elements in a unit of given surface. In other words, it is difficult to reach a high information storage density in relation to the square centimetre.

In addition, for a given total flux, the strengths of the control currents necessary in the two directions are relatively high. Finally, the fact that each element creates around itself a parasitic field whose action affects the neighbouring elements precludes the production of a high storage density.

In order to reduce the magnitude of these unfavorable phenomena, it has been proposed to provide a thin-film element with a member for closing a magnetic circuit containing one of the main axes of magnetisation. However, this improvement, which is also obtained by using tubular thin films, whether discrete or not, is not sufficient to attain the objectives aimed at.

In a patent application filed by the applicants in the United States on Nov. 20, 1967, Ser. No. 684,323, it has been proposed to provide each elemental memory film with two pairs of pole pieces, each pair being parallel to one of the axes of magnetisation. Since the thickness of these pole pieces is greater than that of the film, the lines of force of the external field are deflected from the plane of the film, but the improvement of the characteristics thus obtained is only partial, even when a sheet of material having relatively low permeabiltiy, known as a "keeper" is disposed in proximity thereto.

There has been proposed a memory element comprising a ferromagnetic film associated with two magnetic circuit closing members each disposed on an opposite face of the film and each surrounding one of the control conductors. Although this construction is very effective and has the advantage of having very small overall dimensions, it has the disadvantage that it necessitates a relatively complex and therefore costly process of manufacture.

The invention has for its object to supply a flat-film memory element having a distinctly improved characteristics owing to the almost complete closing of two substantially independent magnetic circuits, each including one of the main axes of magnetisation.

The invention also has for its object to provide a memory element thus improved which is not attended by the aforesaid disadvantages and which lends itself to a somewhat simplified type of collective manufacture in accordance with the techniques of the deposition of thin layers which are at present known.

Thus, in accordance with the invention, in a matrix memory in which each storage cell is located at the crossing point of two conductors belonging to a first set and a second set of orthogonal conductors, respectively, a memory element comprises a plane anisotropic ferromagnetic film disposed at a crossing point and in proximity to a conductor of the first set with a first axis of magnetisation substantially oriented in the same way as the said conductor, and two ferromagnetic closing bridges situated on the same side as the conductors and each applied to the same face of the anisotropic film, these bridges having forms such that their projections on to the plane of the film have no common part, and being so disposed that each conductor is surrounded by a portion of the film and one of the closing bridges in order that the two magnetic fields generated by the control currents in the two conductors may be orthogonal in the anisotropic film.

More precisely, the first closing bridge, of general rectangular form, is disposed above the conductor of the first set and has two ends applied to the said face of the film and the second closing bridge has the general form of a flat C, which is composed of two flat legs disposed on either side of the first closing bridge, and of which one portion is applied to the said face in order to pass under the conductor of the first set, as also a thin connecting member which is so disposed as not to overlap the first closing bridge in projection, and is shaped to allow the passage of the conductor of the second set, appropriate means being provided to ensure the support of these elements, as also their electrical insulation.

Figure 3:
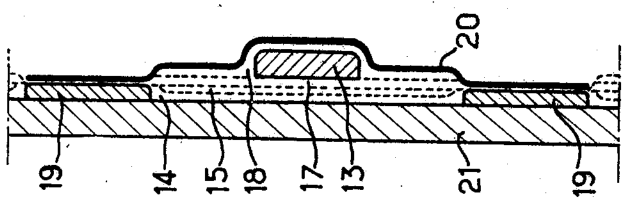
Figures 1, 2:
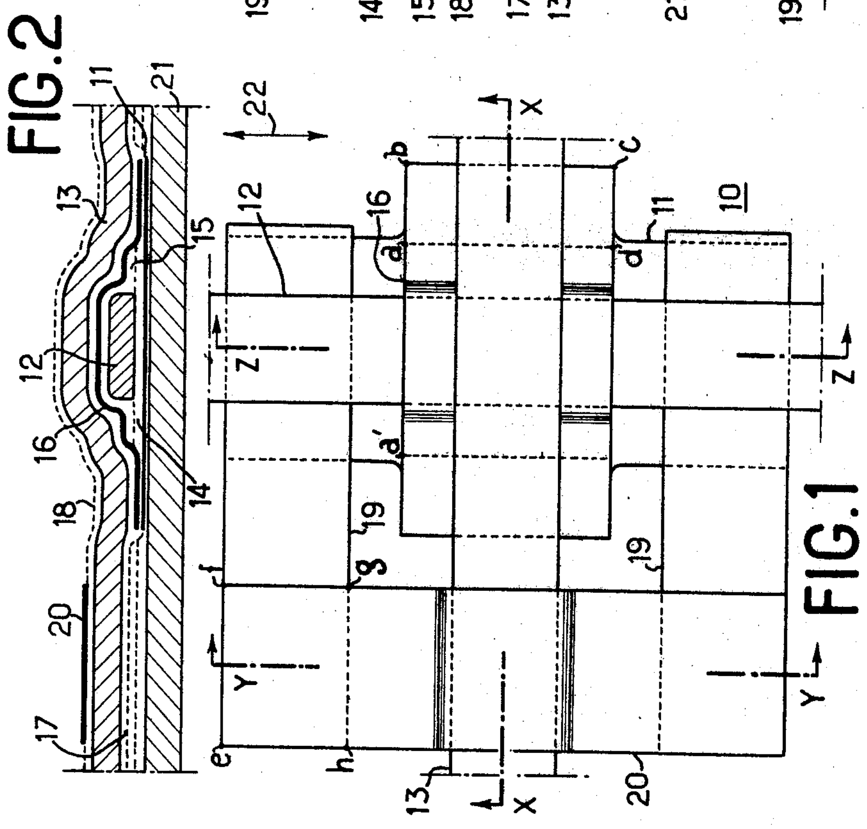
Figure 8:
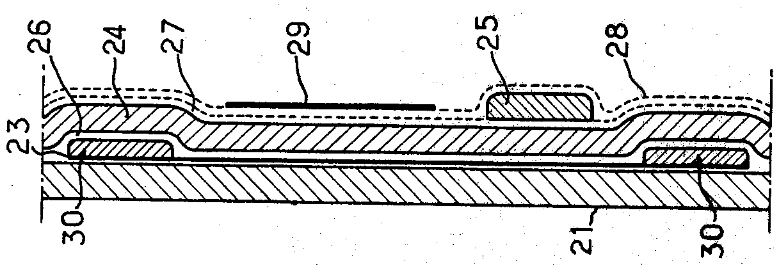
Figure 7:
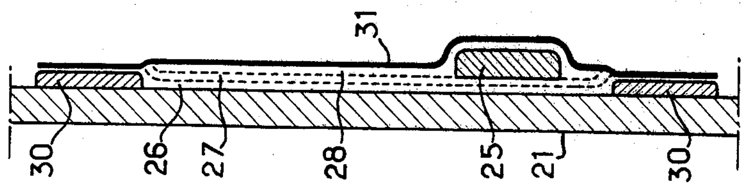
Figure 5:
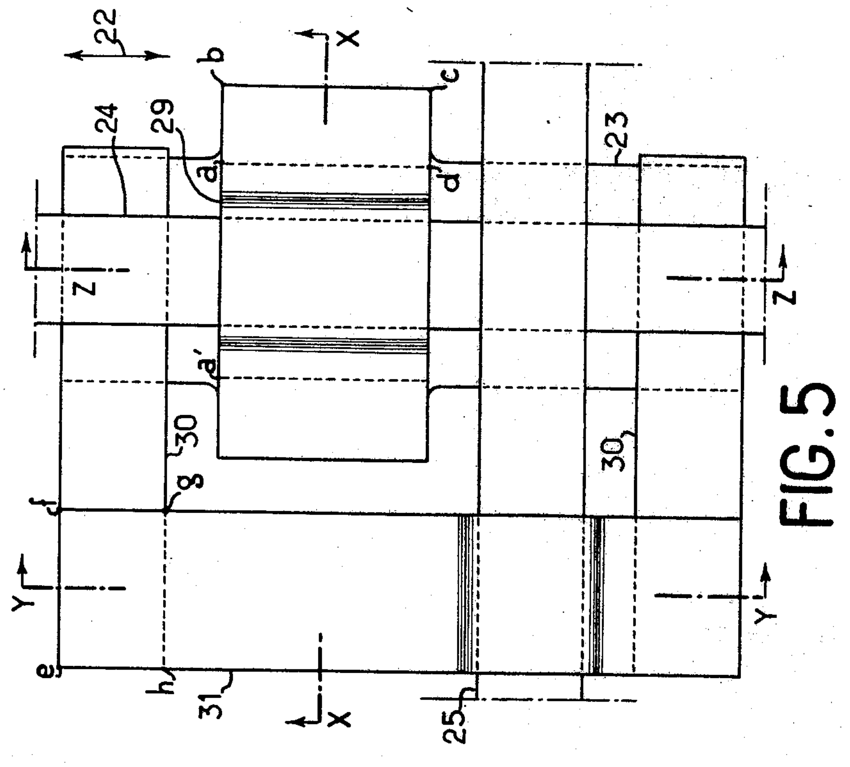
Figure 6:
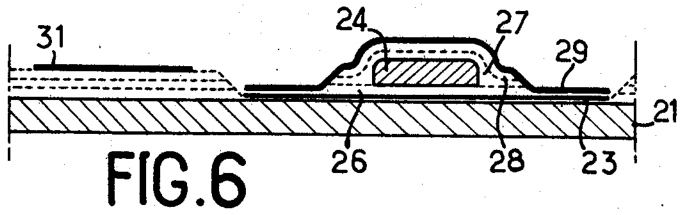
Figure 10:
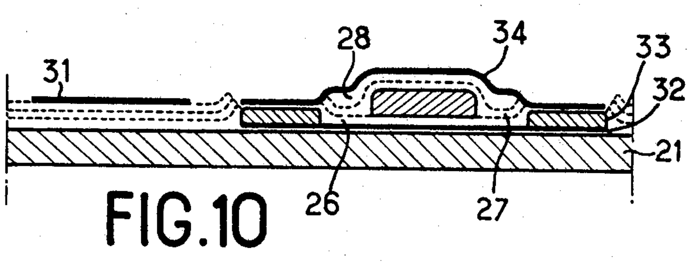
Figure 9:
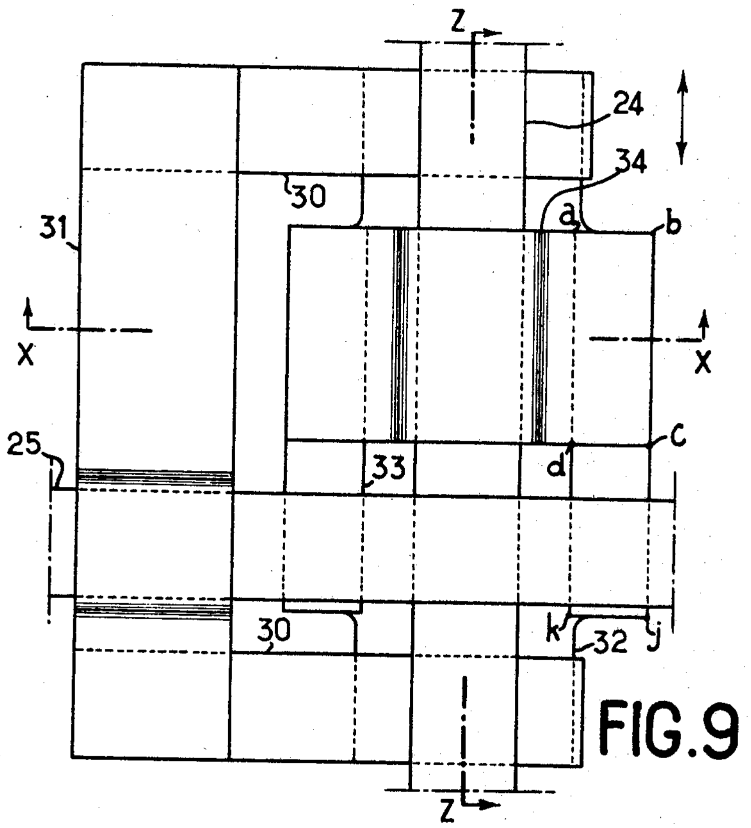

For a better understanding of the invention, embodiments thereof will now be described, by way of example, with reference to the accompanying drawings, in which:

FIGURE 1 is a plan view of a memory element according to a first embodiment of the invention, FIGURES 2, 3 and 4 are sectional views taken along the lines XX, YY and ZZ respectively of FIGURE 1, FIGURE 5 is a plan view of a memory element according to a second embodiment of the invention, FIGURES 6, 7 and 8 are sectional views taken along the lines XX, YY and ZZ respectively of FIGURE 5, FIGURE 9 is a plan view of a constructional variant similar to that of FIGURE 5, and FIGURE 10 is a sectional view taken along the line XX of FIGURE 9.

In these figures, a memory element is so represented in each instance that the thicknesses of the component parts, both conductive and magnetic, are greatly exaggerated in relation to the other dimensions, such as the width and length of these component parts. Moreover, in order not to impair the clarity of the drawings, FIGURES 1, 5 and 9 are drawn as if the insulating layers do not exist or are transparent. However, the limits of the latter are indicated by chain lines in the sectional views.

Reference will be made to FIGURES 1 to 4, which show a memory element 10 symmetrical about the axis XX. This element is constructed essentially around the ferromagnetic film 11. Generally speaking, the latter is rendered anisotropic in its initial fabrication, for example under the action of an appropriate magnetic field. It is disposed on the support 21, which is designed for the construction of a memory plane. This support consists of a sheet of non-magnetic material, for example copper, whose upper face supplies, after superfine grinding a completely plane and smooth surface and is covered by a very thin gold layer.

Situated above this is the word conductor 12, only a portion of which is shown, and above this again the digit conductor 13. The crossing point of the conductors 12 and 13 coincides (FIGURE 1) with the centre of the cruciform surface of the film 11. This surface is in fact symmetrical about the axis ZZ, which is also the axis of the conductor 12, which is parallel to the axis of easy magnetisation of the film, and the direction of which is indicated by the arrow 22.

The word conductor 12 is insulated from the film 11 by a first insulating layer 14. A second insulating layer 15 insulates the conductor 12 from the first closing bridge 16, the projected form of which (FIGURE 1) is rectangular. These insulating layers are interrupted at least in two surfaces such as that defined by the points *a, b, c, d,* so that each of the ends of the closing bridge 16 is in contact with the upper face of the film 11. The closing bridge forms an arch whose length *a–a'* is slightly smaller than the width of the vertical arm of the anisotropic film 11. A third insulating layer 17 separates the closing bridge 16 from the conductor 13, which passes over the axis of difficult magnetisations of the film 11.

The second closing bridge, which has the form of a flat C, is composed of two legs 19 and of a connecting member 20. Assuming that the two legs 19 are deposited at a time when no insulating layer is present, the right-hand portion of each leg is in contact with the upper face of a vertical arm of the film 11. In order that the contours may be more clearly distinguished, each leg has been made to project beyond the edge of the film 11 to the right, but this is not at all essential. A fourth insulating layer 18 separates the conductor 13 from the connecting member 20. The aforesaid four insulating layers are interrupted in two surfaces such as that defined by the points *e, f, g, h,* so that the ends of the closing member 20 are in contact with the legs 19.

There is thus formed a closed magnetic circuit which includes an axis of easy magnetisation and which is composed of the anisotropic film 11, the two legs 19 and the connecting member 20, and which, in the film 11, is orthogonal in relation to the first magnetic circuit including the axis of difficult magnetisation and composed of the film 11 and of the first closing bridge 16. It will be observed that the legs 19 and the connecting member 20 are at a distance from the contour of the first closing bridge 16 in order to minimise the parasitic couplings between the two magnetic circuits, although the latter are situated on the same side of the film. It is also to be observed that the first closing bridge advantageously serves as a metallic screen which reduces the capacitive coupling at the crossing point of the two control conductors. The thickness of the closing bridge 16 and of the connecting member 20 may be of the same order as that of the film 11, or even appreciably greater. It is merely in order to facilitate the reading of the drawing that the legs 19 have been shown thicker than the connecting member 20, because they may in fact be of the same thickness.

Since the magnetic fluxes in the two directions are well concentrated in the memory element, it is possible to choose for the anisotropic film 11 a greater thickness than in the case of a magnetic film having an "open" circuit. For example, this thickness may range from 1000 to 5000 angstroms. It is possible not only considerably to reduce the surface dimensions of the component parts, whereby their bulk is reduced, but also to decrease the spacing between neighbouring memory elements. Thus, the production of a storage density equal to or greater than 500 bits per $cm.^2$ may be envisaged.

Although the grouping of a plurality of such memory elements in a memory plane may be effected by various methods, its structure and miniaturisation can only lead to the use of manufacturing methods of the collective type, involving a succession of depositions and/or gravures of thin layers, each operation which affects all the elements having to be carried out on a common support.

The basic techniques may be very varied, namely evaporation in vacuo either of continuous layers or of layers deposited through masks, chemical deposition, electrolytic deposition, photogravure, etc. These various methods may also be employed in combination, the sequence adopted for the operations depending upon many factors such as materials to be deposited, thicknesses, continuous layers or discrete elements, danger of contamination or pollution, etc.

The closing bridges may consist of a nickel-iron alloy of the "permalloy" type, like all the thin films of the memory elements proper. The word and digit conductors may consist of a metal which is a good conductor, such as copper, silver, aluminum, etc. Their minimum thickness may be of several microns. The insulating layers may be made of silicon monoxide in the case of deposition by evaporation in vacuo, or in the case of other methods of deposition they may consist of various organic varnishes or a photo-sensitive resin known as a "photoresist." Their minimum thickness is of the order of 1 to 2 microns.

The case in which the manufacture of a memory plane involves above all chemical or electrolytical methods of deposition, followed by photogravure, has been mainly considered, at least in regard to the magnetic constituents.

After electrolytic deposition on the support 21 of a nickel-iron layer, in the presence of a suitably oriented magnetic field, to form the anisotropic film 11, the latter are subjected to photogravure. This operation leaves a photoresist layer on the non-engraved parts.

This layer is eliminated and then replaced by a fresh continuous photosensitive insulating layer, which is selectively dissolved in the contours of the legs 19. An isotropic nickel-iron layer is thereafter selectively electrolytically deposited in the zones in which the insulating layer has been eliminated. After complete elimination of this photoresist layer, the conductors 12 may be deposited in the following manner: deposition of the first insulating layer 14 which has to remain in position, chemical deposition of a continuous copper layer, followed by thickening of this layer by electrolytic means; photogravure of the copper layer, leaving the conductors 12; deposition of a fresh photo-sensitive insulating layer 15. After exposure to light through an appropriate plate selective dissolution of the insulating layers 14 and 15 in the surfaces such as *a, b, c, d,* which are subsequently to effect the contact with the closing bridges.

In order thereafter to deposit the first closing bridges 16, metal (for example copper) may first be deposited in vacuo through a mask which defines the contours thereof. The existence of this conductive layer makes it possible thereafter to effect the selective electrolytic deposition of isotropic nickel-iron. This method has the disadvantage of leaving in the magnetic circuit a residual air gap consisting of the conductive layer deposited in vacuo. This disadvantage may be obviated in various ways.

A first solution consists in replacing the copper by a ferromganetic metal such as nickel. No air gap will then remain, but only a discontinuity in the nature of the magnetic material of the first bridge.

Another solution consists in causing the conductive layer, deposited in vacuo, to project only very slightly on the two sides of the insulating layer 15. Since the surfaces such as *a, b, c, d,* have previously been freed from any insulation, it is sufficient for the layer deposited in vacuo to provide a continuous conductive base over the whole surface of the closing bridge 16.

The conductors 13 are produced in the manner indicated with reference to the conductors 12. Finally, the deposition of the second closing bridges 20 may take place in the same way as has been indicated for the closing bridges 16. In the zones such as *e, f, g, h,* the insulating layers deposited in the course of the preceding operations will be eliminated and the contour of each bridge 20 will be defined by a thin metal layer, optionally ferromagnetic, which is deposited in vacuo through an appropriate mask. This deposit will thereafter be thickened by selective electrolytic deposition of isotropic nickel-iron.

Deposition in vacuo may be entirely avoided by chemically depositing a continuous layer of copper or nickel and then thickening the latter by means of an electrolytic deposition of nickel-iron and subsequently engraving this layer. In this case, it is necessary to take precautions to ensure that, in all the zones in which this layer is to be eliminated by engraving, it has been deposited on an underlayer which cannot be attacked by the engraving agent.

As compared with the processes of manufacture described in the foregoing, which are intended to produce magnetic circuits having no air gaps, it may be observed that it is possible to simplify them considerably in all cases where a conductive or insulating air gap may be left in a magnetic closing circuit. Generally speaking, this will involve the necessity to provide a larger surface for all those parts of the magnetic members which are opposite to one another, and consequently a limitation of the density which can be produced in a given surface.

In the case of the memory element illustrated in FIGURES 5 to 8, a design has been aimed at which permits a more economic method of production owing to the reduction of the number of phases of elemental operations. On the other hand, this new memory element is less advantageous in a number of respects than that of FIGURES 1 to 4. More particularly, it has larger overall dimensions, it is not symmetrical about the first closing bridge, and the latter does not perform the function of a metallic screen between the control conductors.

The anisotropic film 23 is again in the form of a cross, but the lower vertical arm (FIGURE 5) is longer. The word conductor 24 is insulated between the insulating layers 26 and 27. The first closing bridge 29 is of general rectangular form with the same dimensions as the closing bridge 16 of FIGURE 1. The second closing bridge is composed of two legs 30 and of a connecting member 31, which are similar to the corresponding parts in FIGURE 1. The digit conductor 25 is not in this case situated above the axis of difficult magnetisation of the film 23, but it is disposed between the first closing bridge 29 and the lower leg 30 of the second closing bridge. Passing below the connecting member 31, the conductor 25 is insulated between the second insulating layer 27 and the third insulating layer 28.

The phases of the manufacture of this memory element are identical to those previously indicated, only up to and including the deposition of the second insulating layer denoted by 27 in the present case. The digit conductors 25 are thereafter produced by chemical and electrolytic deposition and by photogravure. After deposition of the third insulating layer 28 and exposure to light, the three insulating layers are selectively dissolved in all the surfaces such as *a, b, c, d,* and *e, f, g, h.*

Finally, the photogravure of the closing bridges 29 and of the connecting members 31 of the second closing bridges is effected in the course of a single sequence of operations.

FIGURE 9 illustrates a modified embodiment derived from the memory element illustrated in FIGURES 5 to 8, with a view to increasing the useful surface of the anisotropic portion of the film constituting the memory element proper, but without increasing the overall dimensions thereof. The members which are not modified bear the same reference numerals as in FIGURES 5 to 8. There have been added two pole pieces 33 which are applied to the anisotropic film 32. The external form of the latter is modified to receive the said pole pieces, each having a rectangular surface such as that defined by the points *a, b, j, k*. It will be seen that each pole piece extends a little beyond the lower edge of the digit conductor 25. The thickness of the pole pieces 33 may be the same as that of the legs 30, as previously indicated.

In order that the ends of the first closing bridge may be applied to the upper faces of the pole pieces 33 (see FIGURE 10), the insulating layers 26, 27, 28 are interrupted by selective dissolution in the surfaces such as *a, b, c, d,* as in the case of FIGURE 5. The sectional views taken along the lines YY and ZZ have not been shown, because they would be identical to those shown in FIGURES 7 and 8 respectively.

For this variant, the phases of manufacture are substantially identical to those indicated for the production of the memory elements according to FIGURES 5 to 8. The only difference is that the selective electrolytic deposition of the pole pieces 33 is carried out at the same time as that of the legs 30, all other operations being identical.

Finally, it will readily be appreciated that the manufacture of a memory element in accordance with FIGURES 5 to 10 is more economical than that of the memory element according to FIGURES 1 to 4, since it eliminates one operation for depositing an insulating layer and one operation for producing a nickel-iron layer.

The advantages inherent in the described structures possessing two magnetic circuits associated with the main axes of the anisotropic film will be recalled: substantial elimination of the disturbing fields, so that it is possible to increase the storage density, possibility of reducing the strength of the control currents and/or the production of reading signals of higher amplitude. In addition, from the dimensional viewpoint, larger tolerances are permissible on the dimensions and the position of the conductors. It is also possible to space the conductors further from the anisotropic film, so that the thickness of the insulating layers may be increased.

From the viewpoint of the use of a memory plane incorporating a plurality of memory elements according to the invention, it is to be observed that the functions of the conductors such as 12 and 13 (FIGURE 1) may be interchanged, provided that the direction of the axis of easy magnetisation of the anisotropic film is turned through 90°.

Another advantageous aspect of the invention is that, as compared with the use of open magnetic films, the non-destructive reading of the information becomes a much less delicate matter. For example, in the reading, if the "word" current is maintained below a certain level, the rotation of the magnetisation vector is only partial. The reading signal is obviously weaker, but the information previously stored is not destroyed. Further methods of obtaining the same result without weakening the reading signal are possible.

In addition, it is possible, by very simple modifications, to construct a matrix memory which is used only for the reading, after the initial writing of the desired information. Such a memory is often called a "fixed memory." For this purpose, it is sufficient for the connecting member 20 or 31 also to be made anisotropic. At the time of the writing, an additional set of writing conductors, which are not shown in the drawings, must be disposed close to the said connecting members, in a direction parallel to the digit conductors. This set of writing conductors may thereafter be either removed or left in position in the memory plane.

Although the essential features of the invention have been described in the foregoing and illustrated in the drawings, it is obvious that the person skilled in the art may make therein any modifications of form and of detail which may be considered desirable without departing from the scope of the invention.

What is claimed is:

1. In a magnetic matrix store wherein a storage cell is located at each crossing point of two conductors pertaining to a first set and a second set of orthogonal electric conductors, an information storage element of the type comprising:

a thin film of magnetic material having uniaxial anisotropy, located close to a portion of one conductor of said first set of conductors, so that one of its magnetisation axes is parallel to the axis of said conductor, and an isotropic thin film bridge member said member being generally of rectangular outline and arranged over said conductor to have two end parts applied on one face of said film to complete a first magnetic circuit around said one magnetic axis, the improvement consisting in:

a second isotropic thin film bridge member of a substantially flat C form, which member is composed of two flat legs, an end of which is applied on the said face of said film and of a linking part integral with the other ends of said legs, said part being conformed to lie over a portion of a conductor pertaining to said second set of conductors, and thus to complete a second magnetic circuit including said film, and insulating means adapted to position and insulate from each other the conductive and magnetic members.

2. A storage element as claimed in claim 1, wherein the outlines of said film and of said second bridge member are conformed such that said first bridge member and said second bridge member have in projection no overlapping part.

3. A storage element as claimed in claim 2, wherein the thickness of the legs of said second bridge member is substantially greater than that of said film.

4. A storage element as claimed in claim 3, wherein the said portion of said second conductor is a strip which lies over and parallel to the second or transverse magnetisation of said film, over said first bridge member, and which passes under said linking part of said second bridge member.

5. A storage element as claimed in claim 4, wherein the linking part of said second bridge member is made of a magnetic material endowed with uniaxial anisotropy.

6. A storage element as claimed in claim 3, wherein the said portion of said second conductor is a strip which lies parallel to the second or transverse magnetisation axis of said film, between said first bridge member and one leg of said second bridge member and which passes under said linking part of said second bridge member.

7. A storage element as claimed in claim 6, wherein said film extends superficially until under said portion of the conductor of said second set, with a width at least equal to the length of said first bridge member and with lateral portions having a thickness greater than that of the central portion of said film.

References Cited

Publication I; IBM Technical Disclosure Bulletin; vol. 8, No. 11, April 1966, p. 1613: "Coupled Film Memory Device with Improved Write-Disturb Properties."

BERNARD KONICK, Primary Examiner

STEVEN B. POKOTILOW, Assistant Examiner

U.S. Cl. X.R.

29—604, 625